(12) United States Patent
Winkvist

(10) Patent No.: US 6,293,725 B1
(45) Date of Patent: Sep. 25, 2001

(54) COLLET AND METHOD

(76) Inventor: Gunnar Winkvist, S-745 96 Enköping (SE)

( * ) Notice: Subject to any disclaimer, the term of this patent is extended or adjusted under 35 U.S.C. 154(b) by 0 days.

(21) Appl. No.: 09/295,408

(22) Filed: Apr. 21, 1999

(30) Foreign Application Priority Data

Apr. 22, 1998 (SE) .................................................. 9801410

(51) Int. Cl.⁷ ...................................................... F16B 4/00
(52) U.S. Cl. .......................................... 403/282; 403/274
(58) Field of Search ..................................... 403/206, 207, 403/208, 209, 211, 215, 223, 280, 282, 274; 285/334.5; 29/520

(56) References Cited

U.S. PATENT DOCUMENTS

| | | | | |
|---|---|---|---|---|
| 2,185,725 | * | 1/1940 | Elliott | 285/334.5 X |
| 2,466,057 | * | 4/1949 | Somma | 285/344.5 X |
| 3,265,413 | * | 8/1966 | Currie | 285/334.5 X |
| 3,837,755 | * | 9/1974 | Benoit et al. | 403/274 |
| 4,053,247 | * | 10/1977 | Marsh, Jr. | 403/334.5 X |
| 4,172,621 | | 10/1979 | Yoshida . | |
| 4,508,321 | * | 4/1985 | Morimoto | 403/242 X |
| 5,000,612 | * | 3/1991 | Swars | 403/282 X |
| 5,090,837 | * | 2/1992 | Mower | 403/282 X |
| 5,431,379 | * | 7/1995 | Takagi | 403/282 X |
| 5,685,663 | * | 11/1997 | Sadri | 403/282 X |
| 5,718,131 | * | 2/1998 | Bobbitt, III | 403/282 X |

* cited by examiner

Primary Examiner—Anthony Knight
Assistant Examiner—David E. Bochna
(74) Attorney, Agent, or Firm—Young & Thompson

(57) ABSTRACT

A collet for accommodating varying axial loads in a mechanical assembly, includes a first sleeve designed to overlap in coaxial relation to a second sleeve, the second sleeve being formed in one end with a conical transition section rising from a cylinder section designed to be inserted on a spindle for supporting elements in the assembly, the first sleeve being caused to expand in radial direction as the sleeves are axially compressed, the expansion being controlled under guidance of the conical section of the second sleeve to produce an arcuate flange acting upon the conical section to provide a resilient, axial fixation of elements in the assembly.

2 Claims, 2 Drawing Sheets

PRIOR ART

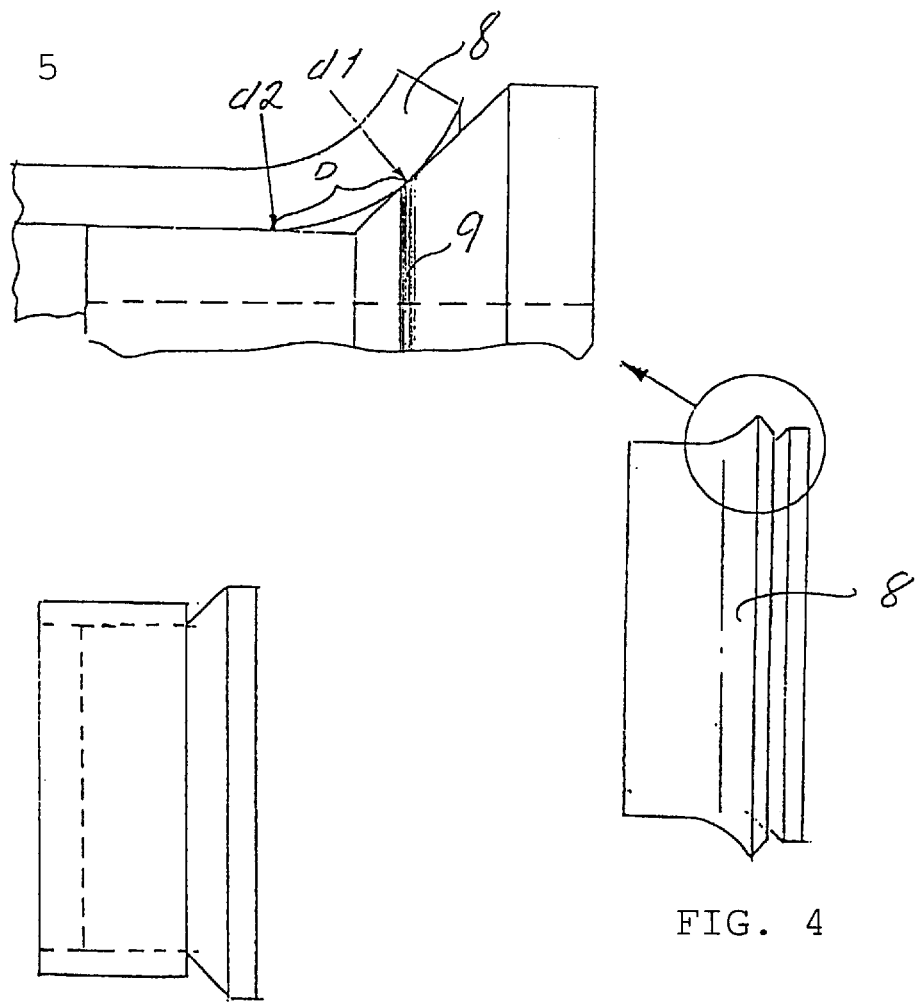
FIG. 5
FIG. 4
FIG. 3
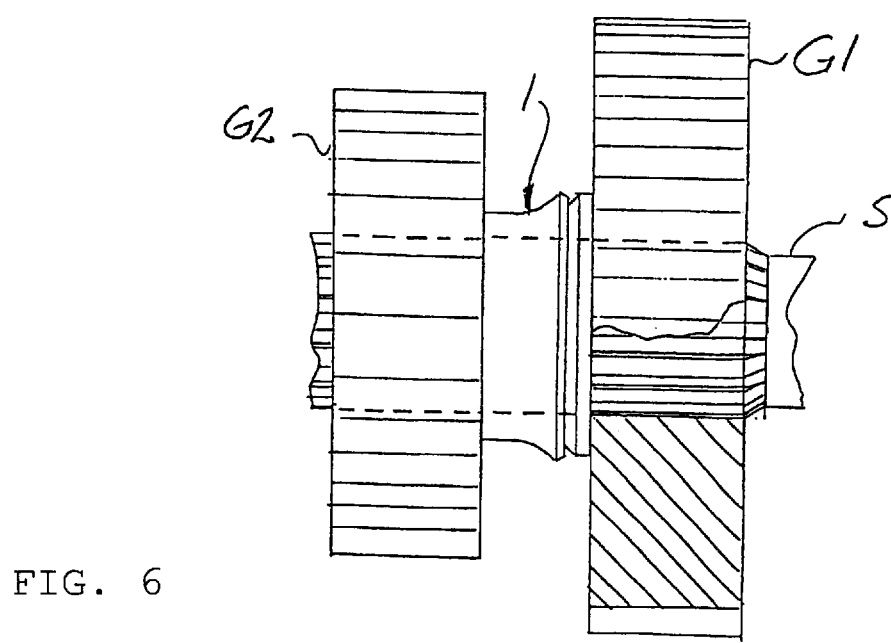
FIG. 6

COLLET AND METHOD

BACKGROUND OF THE INVENTION

The present invention relates to a collet designed to accommodate varying thrust loads in a mechanical coupling. The application also relates to a method in accordance therewith.

DESCRIPTION OF THE RELATED ART

More specifically, the invention relates to a two piece collet, which is axially compressed to expand in a radial direction. In the expanded position, the collet has a flexibility for biasing fixation of elements, supported on a spindle in a mechanical assembly. The invention also provides a method for a resilient, axial fixation of elements supported on the spindle.

Collets of the type referred to are often used in gear boxes, e.g. in an auto gear transmission, where the collet is applied for axially holding gears which are supported on a splined axle. In this application, the collet must be designed to accommodate substantial thrust loads, in the range of about 30–50 kN, e.g., and still having expected axial and radial deformation properties so as not to collapse, but rather to display a certain flexibility also after the initial deformation on assembly. The collet is applied between gears or in contact with a supporting surface, but should be free to rotate on the spindle so as not to cause undue wear. In operation, varying thrust loads may be applied to the collet, as the result of shifting torque.

A prior art collet for application in gear boxes is a one piece ring-shaped element (see FIGS. 1a and 1b) designed with a V-shaped notch or depression, running centrally in the inner periphery of the collet for controlling the radial expansion.

A drawback in this collet is the limited property of flexibility in expanded position. This drawback may be explained from the V-shaped depression acting more or less as a breaking or folding notch.

Another drawback of the prior art collet is the difficulty in production of consistently achieving an optimum dimensioning of the notch, taking into account a subsequent treatment in terms of stress-relieving heating to control the hardness of the material.

Yet another drawback of the prior art, one piece collet is its susceptibility for radial contraction of the ends upon axial compression and deformation, causing the collet to be axially and rotatably locked to the spindle. In case of a gear transmission, the locked collet will cause wear on the spindle and on the engaging gears.

SUMMARY OF THE INVENTION

An object of this invention is therefore to provide a collet, specifically but not exclusively for above said application, which is designed to operate with desired resilient properties within a present load interval.

Furthermore, an object is to provide a collet which is not dependant on subsequent material treatment to achieve the desired properties, whereby the drawbacks of the prior art collet are eliminated.

Briefly, the invention relates to a collet for accommodating varying thrust loads in a mechanical coupling, comprising a first cylinder shaped sleeve formed to overlap in coaxial relation with a second sleeve, said first sleeve having a cylinder wall designed for deformation under radial expansion when the sleeves are axially compressed upon assembly on a spindle where the collet is applied for a biasing, axial fixation of gears which are supported on the spindle. Said second sleeve is formed in one end with a conical transition section rising from a cylinder section and adjoining an end section of greater radius in the second sleeve, the conical transition section having a slope angle relative to a longitudinal axis, wherein the first sleeve, upon axial compression of the sleeves, is caused to be plastically deformed and to expand in radial direction under guidance of the conical section such that an arcuate flange is formed in the first sleeve and acting upon the sloping surface of the conical section, thereby providing a resilient, axial fixation of the gears when the collet is maintained within or near a yielding, axial pressure.

By introducing a collet comprising the above said features, there is also suggested a method of providing a resilient, axial fixation of gears supported on a spindle in a mechanical assembly, wherein a two piece collet is designed to be inserted between gears, or between gears and a support surface. The collet is axially compressed and caused to expand in radial direction under an axial load which is applied to the ends of the collet, wherein the radial expansion is controlled in such way that the collet is maintained within or near a yielding pressure in the assembly.

BRIEF DESCRIPTION OF THE DRAWINGS

In the following, a collet of the invention will be described in detail, reference being made to the accompanying drawings wherein FIGS. 1a and 1b, resp., show the prior art collet adapted to accommodate thrust loads in a mechanical assembly;

FIG. 3 shows the collet of FIG. 2 in assembled position, before it is axially compressed;

FIG. 4 shows the collet of FIG. 3, axially compressed and expanded in radial direction;

FIG. 5 shows a detail of the collet of FIG. 4, on an enlarged scale, and

FIG. 6 shows the inventive collet axially compressed in a mechanical assembly, in a partly sectioned, elevation view on a reduced scale.

DESCRIPTION OF THE PREFERRED EMBODIMENT

Figure 1A:
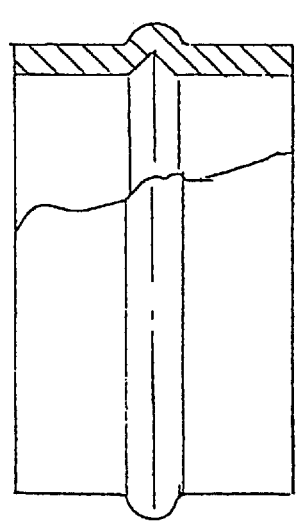
Figure 1B:
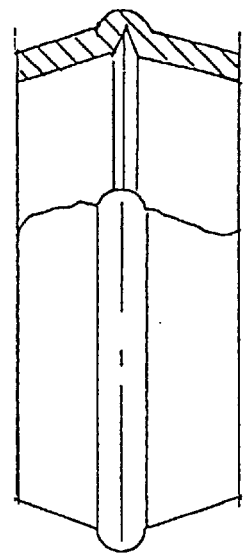

For comparison, FIG. 1a is a longitudinal section of a prior art collet before axial compression, and FIG. 1b is a longitudinal section of the prior art collet after it is being axially compressed, and expanded in radial direction. The known, ring-shaped collet has in its inner periphery a V-shaped notch or depression, running around the inner periphery. On the outer periphery, a corresponding bulge is formed, surrounding the collet in a central area thereof like an inverted waistline. The notch is formed to provide a controlled deformation, by enhancing the elasticity of the collet to accommodate for the axial compression as the mechanical assembly is tightened from both ends of the collet.

However, the surrounding notch of the prior art collet may also have the non-desired effect of increasing the risk of a fracture of the collet. In this aspect, the prior art collet also has less capacity for accommodating varying axial loads, as the notch may lower the yield limit of the collet under compression. When this occurs, the desired flexibility and elasticity will disappear in the prior art, one piece collet.

Figure 2:
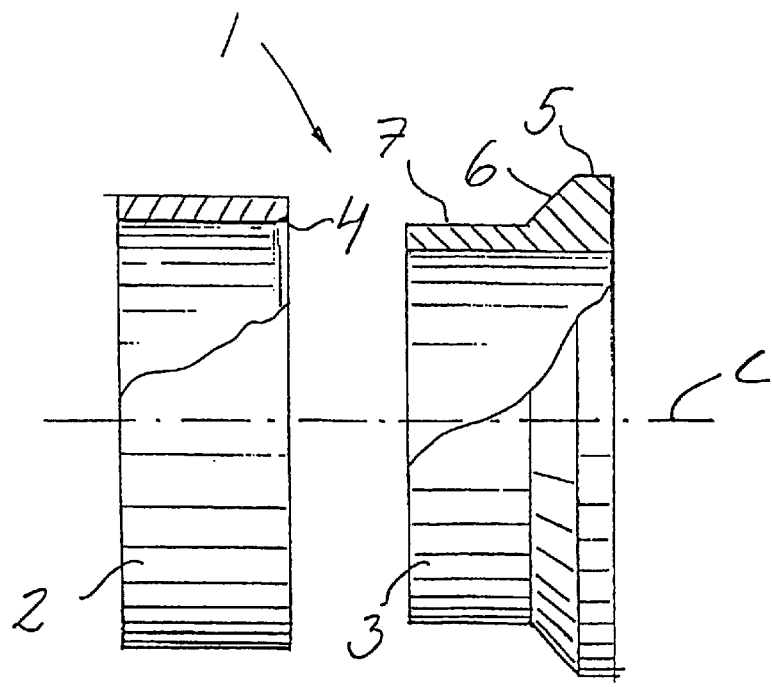
FIG. 2 shows the inventive two piece collet before assembly.

The collet 1 of the invention comprises two separate sleeves 2 and 3, as can be seen in FIG. 2.

A first sleeve 2 is cylindrical and formed to overlap in coaxial relation to a second sleeve 3, and may be formed with planar ends. The inside rim 4 of at least one end of the first sleeve 2 may be beveled or formed with a radius.

A second sleeve 3 has a central through hole for insertion of a spindle S (FIG. 6), and may be formed with planar ends. In one of its ends, the sleeve 3 is formed with greater radius to comprise a radial collar 5, which connects to the cylinder section 7 by a recta-linear, slanting or cone-shaped transition section 6 having a slope angle relative to a longitudinal axis C.

On assembly of the inventive collet 1, the first sleeve 2 is placed to overlap in coaxial relation and with a close fit to the cylinder section 7 of the second sleeve 3, as illustrated in FIG. 3 of the drawings, Under sufficient axial load, applied to the ends of the collet via gears G1, G2 as of FIG. 6, the sleeves are axially compressed for a plastic deformation of the sleeve 2 and under guidance of the conical transition section 6. In FIG. 4, the deformation is shown to produce an arcuate flanging 8 of the sleeve 2. The arcuate radius of the flange 8 will be determined by the slope angle of the conical section 6 relative to the longitudinal axis. Due to the inherent elasticity of the material, a degree of spring back could be expected if the axial load is reduced. According to the invention, a desired spring back is secured and enhanced by the formation of the conical section 6, upon which the radial flange (8) acts within an axial load interval near to a yield limit of the first sleeve 2.

As can be seen in FIG. 5, the deformation area D spans the connection point of the conical section 6 and the cylinder section 7, and extends from a point of contact d1 to a point d2 where the radial expansion is initiated, as the collet 1 is compressed by applying the axial load from both ends of the collet 1 during assembly of the mechanical coupling. During axial compression of the sleeves, the point d2 is continuously displaced on the sleeve 2 which is successively formed to have an arcuate flanging 8. Due to the arcuate shape of the flange 8, the sleeves in compressed position will engage only by a circular line of contact 9 in the periphery of the transition section 6. The limited engagement area prevents a friction interlock between the sleeves, and promotes a resilient spring back capacity of the collet 1 in a mechanical coupling where it is applied under varying axial load within a pressure interval.

In effect of the relative displacement of the point d2 and the sleeve 2 during compression and deformation, non-expanded material is continuously supplied to the deformation area so that consistent expansion is maintained during the entire axial movement. Hereby, the collet 1 stays within the applied load, i.e. within or near the yield limit, as long as the axial pressure is maintained.

In a specific embodiment of the inventive collet 1, the sleeve 2 has a wall thickness of about 2.2 mm, a section of about 40 mm, and the collet has a total length of about 16.5 mm before axial compression. The sleeve 2 is produced from structural steel suitable for machining. The conical section 6 slopes at an angle of 45° relative to the longitudinal axis. This embodiment of the collet 1 has been tested to provide stable deformation properties within a load interval from about 44 kN to about 46 kN, with a spring-back capacity of about 0.25 mm after an axial compression in the range of approximately 1.2 mm to 3.0 mm. In other words, the disclosed embodiment of the two piece collet has a capacity for balancing an axial play of approximately 3.0 mm on assembly, and is still providing a desired elasticity to accommodate for varying thrust loads in the assembly, within a predestinated load interval of 44 to 46 kN.

The influence on the cylinder section of the sleeve 3 from the deformation force is insignificant; the material thickness of the collar 5 and the conical section 6 secures form stability of the sleeve 3 during compression. The through hole of the sleeve 3 remains unchanged, and the drawback of the prior art collet to lock onto the spindle is eliminated.

The invention may be changed in various ways with respect to material properties, dimensioning and the slope angle of the conical section when adapting the two piece collet to a specific application. Thus, the slope angle, e.g., may be adopted to the wall thickness and the yield capacity of the chosen material. The suggested slope angle of 45° relative to the longitudinal axis is to be seen as a non-limiting example only, and the slope may be varied in the range of 15–75°, e.g., in dependence of the chosen material, the calculated dimensions and the desired load capacity. A suggested slope angle is herein disclosed as ranging from 30° to 60°, whereas a preferred slope angle of the tested collet 1 made of machinery steel is considered to range from 35° to 45°, and most preferred 45° relative to the longitudinal axis.

Alternatively, the conical transition section 6 may even be formed to have a varying slope angle relative to the cylinder section of the sleeve 3, e.g. in the form of a convex, arcuate or facet surface.

Accordingly, there is provided a collet 1 for accommodating varying thrust loads in a mechanical coupling, comprising a first cylinder shaped sleeve 2 formed to overlap in coaxial relation with a second sleeve 3, said first sleeve 2 having a cylinder wall designed for deformation under radial expansion when the sleeves 2,3 are axially compressed upon assembly on a spindle where the collet 1 is applied for a biasing, axial fixation of gears which are supported on the spindle. Said second sleeve 3 is formed in one end with a conical transition section 6 rising from a cylinder section 7 and adjoining an end section 5 of greater radius in the second sleeve 3, the conical section having a slope angle relative to a longitudinal axis, wherein the first sleeve 2, upon axial compression of the sleeves 2,3 is caused to be plastically deformed and to expand in radial direction under guidance of the conical section 6 such that an arcuate flange 8 is formed in the first sleeve 2 to act upon the sloping surface of the conical section 6, thereby providing a resilient, axial fixation of the gears when the flange 8 is maintained within or near a yielding, axial pressure.

What is claimed is:

1. A collet, adapted to be arranged on a spindle in an automobile gear transmission for accommodating varying thrust loads appearing between gears that are supported on the spindle, said collet comprising:

a first cylinder-shaped sleeve and a second sleeve, the first cylinder-shaped sleeve formed to overlap in coaxial relation with the second sleeve, said first sleeve having a cylinder wall designed for deformation under radial expansion when the first and second sleeves are axially compressed upon assembly, said second sleeve being formed in one end thereof with a conical transition section rising from a cylinder section and adjoining an end section of greater radius than said cylinder section, the conical section having a slope angle relative to a longitudinal axis, wherein the first sleeve, upon axial compression of the sleeves is caused to be plastically expanded in radial direction under guidance of the conical section such that an arcuate flange is formed in the first sleeve to act upon the sloping surface of the conical section of said second sleeve, the flange being dimensioned to expand and to be maintained under a yielding axial pressure interval thereby providing the collet an axial resiliency for accommodating varying thrust loads within said yielding axial pressure interval, wherein the cylinder wall of the first sleeve is dimensioned such that radial expansion of the cylinder wall occurs at a predetermined axial load interval of 30–50 kN.

2. A collet, adapted to be arranged on a spindle in an automobile gear transmission for accommodating varying thrust loads appearing between gears that are supported on the spindle, said collet comprising:

a first cylinder-shaped sleeve and a second sleeve, the first cylinder-shaped sleeve formed to overlap in coaxial relation with the second sleeve, said first sleeve having a cylinder wall designed for deformation under radial expansion when the first and second sleeves are axially compressed upon assembly, said second sleeve being formed in one end thereof with a conical transition section rising from a cylinder section and adjoining an end section of greater radius than said cylinder section, the conical section having a slope angle relative to a longitudinal axis, wherein the first sleeve, upon axial compression of the sleeves is caused to be plastically expanded in radial direction under guidance of the conical section such that an arcuate flange is formed in the first sleeve to act upon the sloping surface of the conical section of said second sleeve, the flange being dimensioned to expand and to be maintained under a yielding axial pressure interval thereby providing the collet an axial resiliency for accommodating varying thrust loads within said yielding axial pressure interval, wherein the cylinder wall of the first sleeve is dimensioned such that radial expansion of the cylinder wall occurs at a predetermined axial load interval of 44–46 kN.

\* \* \* \* \*